(12) United States Patent
Fujihara et al.

(10) Patent No.: US 8,473,676 B2
(45) Date of Patent: Jun. 25, 2013

(54) CONTROLLING REPLICATION OF DATA AMONG STORAGE DEVICES

(75) Inventors: Shinobu Fujihara, Yamato (JP);
Takeshi Inagaki, Sagamihara (JP);
Shinsuke Mitsuma, Machida (JP);
Kazuhiro Tsuruta, Sagamihara (JP);
Terue Watanabe, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 1288 days.

(21) Appl. No.: 12/251,799

(22) Filed: Oct. 15, 2008

(65) Prior Publication Data
US 2009/0106510 A1    Apr. 23, 2009

(30) Foreign Application Priority Data
Oct. 17, 2007    (JP) .................... 2007-269971

(51) Int. Cl.
*G06F 12/00*    (2006.01)
*G06F 13/00*    (2006.01)

(52) U.S. Cl.
USPC ............... 711/114; 711/154; 711/E12.084; 711/E12.001

(58) Field of Classification Search
USPC ............... 711/114, 154, E12.084, E12.001
See application file for complete search history.

(56) References Cited

FOREIGN PATENT DOCUMENTS
JP    2005-528688    9/2005
JP    2006-079386    3/2006

*Primary Examiner* — Yong Choe
(74) *Attorney, Agent, or Firm* — Richard M. Kotulak

(57) ABSTRACT

A control apparatus connected to different types of storage devices include a performance-information storing section that stores performance information on the storage devices; a list storing section that stores a list of data on the storage devices; a monitoring section that monitors the load statuses of the storage devices and the control apparatus; a detecting section; an estimating section; and a determining section.

17 Claims, 11 Drawing Sheets

FIG. 3
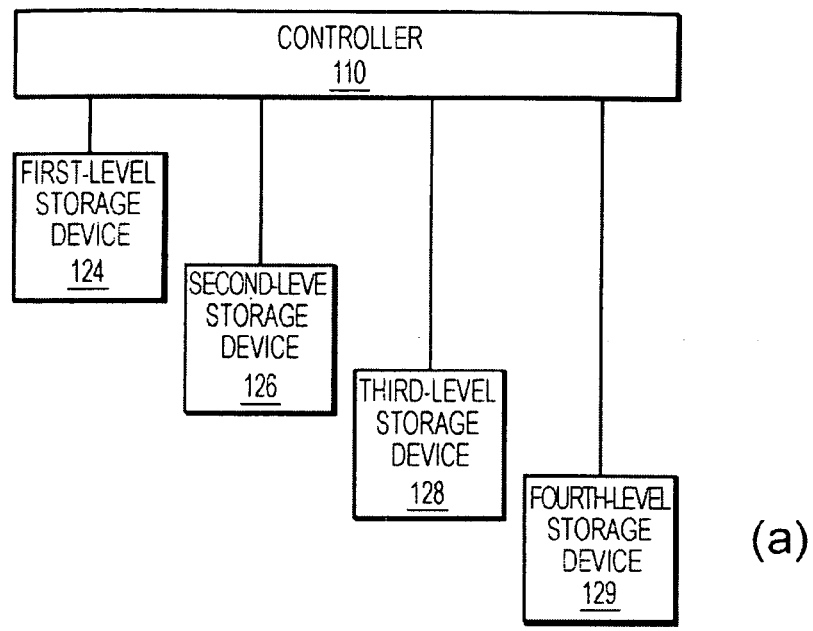
(a)
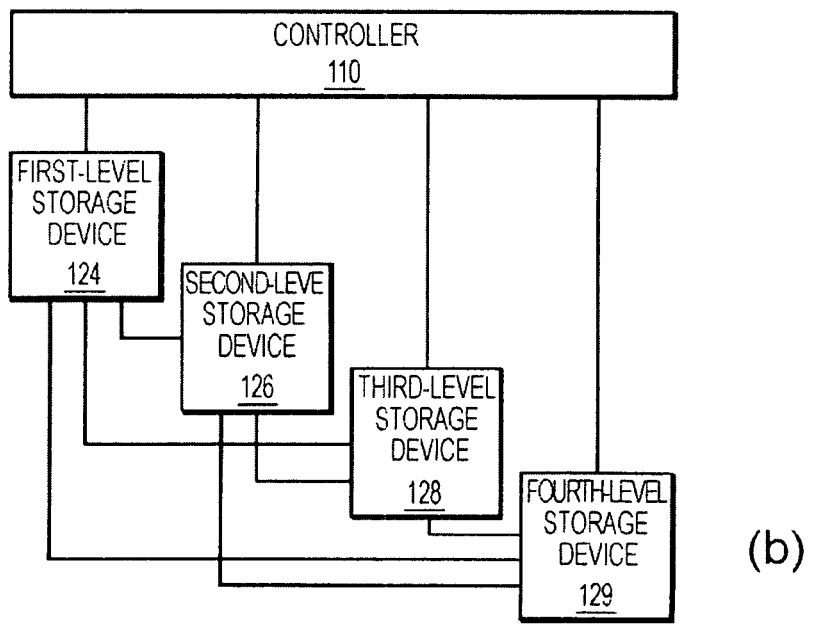
(b)

FIG. 7

| | DEVICE NAME | ACCESS TIME t (sec) | DATA TRANSFER RATE D (byte/sec) | NETWORK TRANSFER RATE N (byte/sec) | SYSTEM LIMITATION |
|---|---|---|---|---|---|
| FIRST LEVEL | SEMI-CONDUCTOR MEMORY 710 | $t_{A1}$ | $D_{A1}$ | N | ONLY EXTERNAL REQUEST IS ACCEPTED |
| SECOND LEVEL | MAGNETIC DISK 720 | $t_{A2}$ | $D_{A2}$ | N | — |
| THIRD LEVEL | OPTICAL DISK 730 | $t_{A3}$ | $D_{A3}$ | N | — |
| FOURTH LEVEL | TAPE 740 | $t_{A4}$ | $D_{A4}$ | N | — |
| — | — | $t_{A1} < t_{A2} < t_{A3} < t_{A4}$ | $D_{A1} > D_{A4} > D_{A2} > D_{A3}$ | — | — |

FIG. 8

| | DEVICE NAME | LOAD (%) |
|---|---|---|
| FIRST LEVEL | SEMI-CONDUCTOR MEMORY 710 | $\alpha_{A1}$ |
| SECOND LEVEL | MAGNETIC DISK 720 | $\alpha_{A2}$ |
| THIRD LEVEL | OPTICAL DISK 730 | $\alpha_{A3}$ |
| FOURTH LEVEL | TAPE 740 | $\alpha_{A4}$ |

(a)

| | LOAD (%) |
|---|---|
| STORAGE SYSTEM 100 | $\beta_A$ |
| STORAGE SYSTEM 160 | $\beta_B$ |

(b)

| | LOAD (%) |
|---|---|
| NETWORK 140 | $\gamma$ |

(c)

CONTROLLING REPLICATION OF DATA AMONG STORAGE DEVICES

BACKGROUND

Attention is being given to a hierarchical storage system in which different types of storage having different characteristics are logically combined into one storage device. In the hierarchical storage system, fast but small-capacity and high-price storage devices are placed in higher rank and large-capacity and low-price but slow storage devices are placed in lower rank. For example, relatively high-price and high-speed storage devices such as semiconductor or magnetic disks are placed in higher rank and relatively low-price and low-speed storage devices such as optical disks and magnetic tape libraries are placed in lower rank.

Such hierarchical storage devices provide a transparent hierarchical structure in response to external file access. That is, as shown in FIG. 1, access to a hierarchical storage system 50 is executed via a file access point 10 that is present only in the first-level storage device 124; it is not taken into account during access which level of first-level storage device 124, second-level storage device 126, third-level storage device 128, or fourth-level storage device 129 an object file is present.

a. For example, a file stored in the first-level storage device 124 transfers to the second-level storage device 124 after two weeks and to the fourth-level storage device 129 after three years according to its attribute information (for example, the last access date). However, if an external file access request is given, the file is transferred or replicated among the levels back to the first-level storage device 124, and is finally accessed from the only file access point 10 in the first-level storage device 124. In this specification, "file access point" indicates information for searching for an object file in a hierarchical structure: examples for a network are MAC address and IP address, and for a file system, a path. Although actual hierarchical storage systems such as storage system 50 have a controller for controlling the input and output to/from the first-level storage device 124, second-level storage device 126, third-level storage device 128, and fourth-level storage device 129, FIG. 1 omits the controller for clarity.

In a conventional hierarchical storage systems, such as storage system 50, the file access point, such as file access point 10 is present only in the first-level storage device 124; file transfer or replication among first-level storage device 124, second-level storage device 126, third-level storage device 128, and fourth-level storage device 129 is executed from one storage device to the storage device directly above it or from one storage device to the storage device directly below it in sequence without skipping the intermediate levels (refer to FIG. 1). Therefore, if file transfer processing or file replication processing is executed in one of first-level storage device 124, second-level storage device 126, third-level storage device 128, or fourth-level storage device 129 and when an object file is present in a plurality of storage devices of different levels such as first-level storage device 124, second-level storage device 126, third-level storage device 128, and fourth-level storage device 129, a storage device at a level that is logically closest to a destination storage device is unconditionally selected as a source storage device.

Accordingly, the data transfer or replication among first-level storage device 124, second-level storage device 126, third-level storage device 128, and fourth-level storage device 129 in the conventional hierarchical storage systems 50 has the problem of wasting the resources or the first-level storage device 124, second-level storage device 126, third-level storage device 128, or fourth-level storage device 129 present between the source storage device and the destination storage device and energy for operating the resources. The data transfer or replication among storage devices first-level storage device 124, second-level storage device 126, third-level storage device 128, and fourth-level storage device 129 in the conventional hierarchical storage systems 50 further has the problem of requiring much time.

SUMMARY

The present invention relates to controlling transfer or replication of data among a plurality of storage devices, and more specifically, it relates to a technique for selecting an optimum storage device from among a plurality of storage devices as the source of data transfer or replication.

a. According to one embodiment of the invention, a control apparatus connected to different types of storage devices is provided including a performance-information storing section that stores performance information on the storage devices; a list storing section that stores a list of data stored in the storage devices; a monitoring section that monitors the load statuses of the storage devices and the control apparatus; a detecting section that detects a storage device that stores data to be transferred or replicated on the basis of the list stored in the list storing section before the data is transferred or replicated to any of the storage devices; an estimating section that estimates the time required to transfer or replicate the data from each of the storage devices detected by the detecting section to a destination storage device on the basis of the performance information and the load information monitored by the monitoring section; and a determining section that determines the source of data transfer or replication on the basis of estimates made of by the estimating section.

b. According to another embodiment of the invention, a storage system is provided, including different types of storage devices; and a control apparatus for controlling the input and output of data to/from the different types of storage devices. The control apparatus includes a performance-information storing section that stores performance information on the storage devices; a list storing section that stores a list of data stored in the storage devices; a monitoring section that monitors the load statuses of the storage devices and the control apparatus; a detecting section that detects a storage device that stores data to be transferred or replicated on the basis of the list stored in the list storing section before the data is transferred or replicated to any of the storage devices; an estimating section that estimates the time required to transfer or replicate the data from each of the storage devices detected by the detecting section to a destination storage device on the basis of the performance information and the load information monitored by the monitoring section; and a determining section that determines the source of data transfer or replication on the basis of estimates made by the estimating section.

c. According to yet another embodiment of the invention, a method for controlling data transfer or replication that is executed by a control apparatus connected to different types of storage devices via a network or directly, is provided including monitoring the load statuses of the different types of storage devices and the network; detecting a storage device that stores data to be transferred or replicated from among the different types of storage system before the data is transferred or replicated to any of the storage devices; estimating the time required to transfer or replicate the data from each of the detected storage devices to a destination storage device on the basis of the performance and the load statuses of the storage devices; and determining the source storage device of data transfer or replication on the basis of the estimates.

d. According to yet another embodiment of the invention, a program product having program code for controlling data transfer or replication that is executed by a control apparatus connected to different types of storage devices via a network or directly, is provided including a program code for monitoring the load statuses of the different types of storage devices and the network; program code for detecting a storage device that stores data to be transferred or replicated from among the different types of storage system before the data is transferred or replicated to any of the storage devices; program code for estimating the time required to transfer or replicate the data from each of the detected storage devices to a destination storage device on the basis of the performance and the load statuses of the storage devices; and program code for determining the source storage device of data transfer or replication on the basis of the estimates.

BRIEF DESCRIPTION OF THE SEVERAL VIEWS OF THE DRAWINGS

FIG. 3(a) shows a block diagram of an example of a connection in a storage system according to an embodiment of the invention.

FIG. 3(b) shows a block diagram of another example of a connection in a storage system according to an embodiment of the invention.

FIG. 7 shows an example of performance information stored in a storage unit.

FIG. 8(a) shows a table showing an example of load information according to an embodiment of the invention.

FIG. 8(b) shows a table showing an example of load information according to an embodiment of the invention.

FIG. 8(c) shows a table showing an example of load information according to an embodiment of the invention.

DETAILED DESCRIPTION

Figure 1:
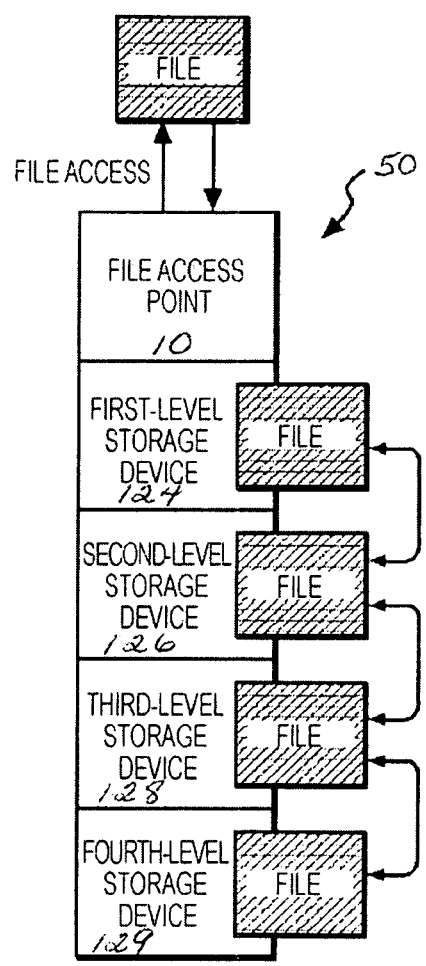
FIG. 1 shows a block diagram of a conventional storage system.

While the invention will be described in its best mode with reference to the drawings, it is to be understood that the following embodiments do not limit the invention according to the claims and that all the combinations of the characteristics described in the invention are not absolutely necessary for solving the problems. The invention can be applied not only to the hierarchical storage system described as background but also to a grid storage system. We will describe an application to the hierarchical storage system hereinbelow by way of example, wherein like elements are given like reference numerals throughout.

Figure 2:
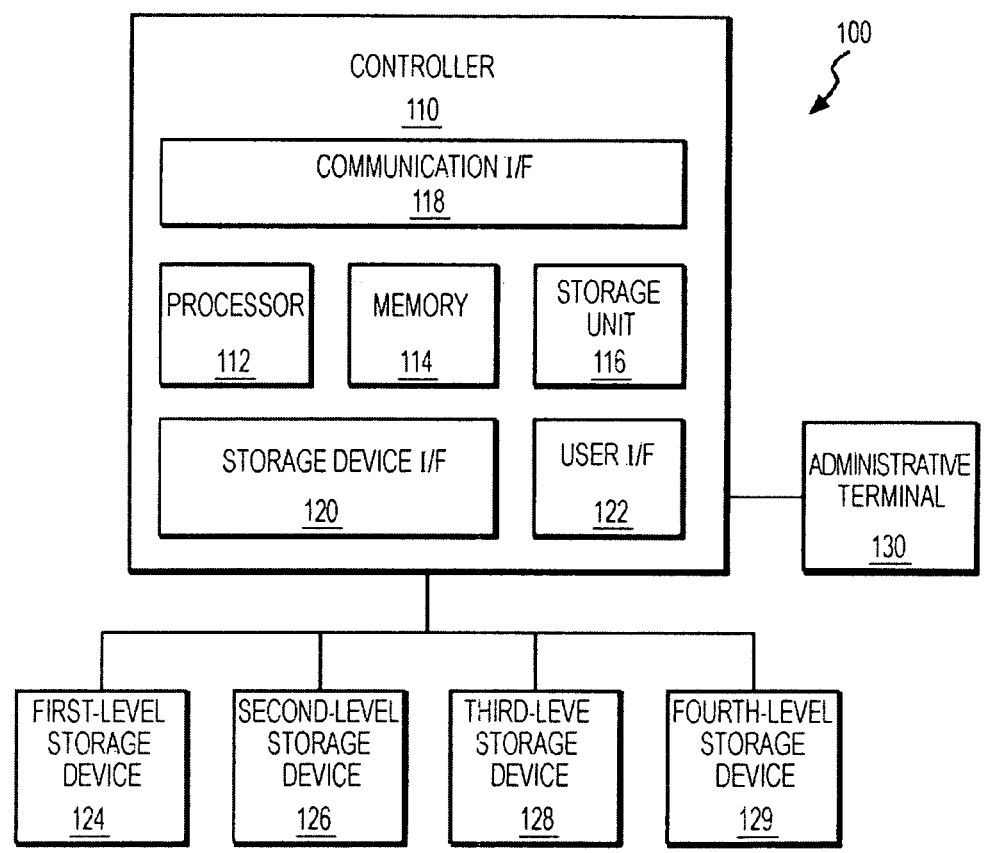
FIG. 2 shows a block diagram of the hardware structure of a storage system according to an embodiment of the invention.

With reference now to FIG. 2, FIG. 2 shows an example of a typical hardware structure of a storage system 100 that can be used in an embodiment of the invention. The storage system 100 of this embodiment includes a first-level storage device 124, a second-level storage device 126, a third-level storage device 128, and fourth-level storage device 129 of different types and a controller 110 for controlling the input and output of data to/from the first-level storage device 124, second-level storage device 126, third-level storage device 128, and fourth-level storage device 129 of different types.

The controller 110 temporarily stores a data block in a buffer on an internal memory 114 in response to a data write request or a read request from a host computer (not shown). A processor 112 writes and reads data to/from the first-level storage device 124, second-level storage device 126, third-level storage device 128, and fourth-level storage device 129 of different types via a storage device interface 120 according to a program stored in a storage unit 116, and thus the controller 110 controls the input and output of data to/from the first-level storage device 124, second-level storage device 126, third-level storage device 128, and fourth-level storage device 129.

The controller 110 also controls transfer and replication of data among the first-level storage device 124, second-level storage device 126, third-level storage device 128, and fourth-level storage device 129 of different types according to a predefined storage administration policy. The storage administration policy is stored in the storage unit 116 via a user interface 122 by an administrator who operates an administrative terminal 130. The storage unit 116 according to this embodiment also stores a program for controlling the transfer or replication of data among the first-level storage device 124, second-level storage device 126, third-level storage device 128, and fourth-level storage device 129 according to an embodiment of the invention. The processor 112 in the controller 110 selects an optimum storage device as the source of transfer or replication from among the storage devices according to the program.

The first-level storage device 124, second-level storage device 126, third-level storage device 128, and fourth-level storage device 129 of different types according to this embodiment have a hierarchical structure. The first-level storage device 124 and the second-level storage device 126 are constituted by high-speed storage devices such as semiconductor memories and magnetic disks. The third-level storage device 128 and the fourth-level storage device 129 are constituted by low-speed storage devices such as optical disks and magnetic tapes.

Referring now to FIG. 3, the connection between the controller 110 and the first-level storage device 124, second-level storage device 126, third-level storage device 128, and fourth-level storage device 129 of different types shown in FIG. 2 will be described. The storage system 100 of this embodiment has a file access point in each of the first-level storage device 124, second-level storage device 126, third-level storage device 128, and fourth-level storage device 129 as shown in FIG. 4(a). Specifically, the first-level storage device has a file access point 12, the second-level storage device has a file access point 14, the third-level storage device has a file access point 16, and the fourth-level storage device has a file access point 18.

This structure allows the first-level storage device 124, second-level storage device 126, third-level storage device 128, and fourth-level storage device 129 of different types to be connected to one another so that data transfer or replication between any two of first-level storage device 124, second-level storage device 126, third-level storage device 128, and fourth-level storage device 129 can be achieved without data passing through the other storage devices except the two storage devices. The storage system 100 according to this embodiment further has a file access point 10 that enables access to a file (see FIG. 4(*a*)) irrespective of the hierarchical structure of first-level storage device 124, second-level storage device 126, third-level storage device 128, and fourth-level storage device 129 as in the conventional hierarchical storage system 50.

In this embodiment, multiple storage devices, such as first-level storage device 124, second-level storage device 126, third-level storage device 128, and fourth-level storage device 129 sometimes have multiple copies of the same file. Therefore, the storage system 100 may have a file identifier for uniquely identifying the copies. File access may be executed using a combination of file access paths corresponding to the file access points 12 to 18 which are so-called path information for file access and the file identifier. For example, if "/tier1/" is given as a file access path and "GID0010" is given as a file identifier, file access is executed by designating "/tier1/GID0010". Here, "tierN" designates the N$^{th}$-level storage device. Suppose multiple file access paths, for example, "/tier1/", "/tier2/", and "/tier3/" are present. In this case, access to the same file through the file access paths is executed by designating "/tier1/GID0010", "/tier2/GID0010", and "/tier3/GID0010". In the case where multiple storage systems, such as storage system 100, each have a copy of the same file, a request for file access is executed by further specifying a storage system such as storage system 100.

Examples of the connection between the controller 110 and the first-level storage device 124, second-level storage device 126, third-level storage device 128, and fourth-level storage device 129 of different types in this storage system 100 are shown in FIGS. 3(*a*) and 3(*b*). FIG. 3(*a*) shows a structure in which the first-level storage device 124, second-level storage device 126, third-level storage device 128, and fourth-level storage device 129 in the storage system 100 connect only to the controller 110. In this case, the data transfer between storage devices of two layers is always executed via the controller 110.

FIG. 3(*b*) shows a structure in which each of the first-level storage device 124, second-level storage device 126, third-level storage device 128, and fourth-level storage device 129 in the storage system 100 connect not only to the controller 110 but also to one another (i.e. storage devices of other layers). In this case, there are two data transfer paths between storage devices in two layers. One is a path via the controller 110, and the other is a direct path, which of them controller 110 selects as a data transfer path for first-level storage device 124, second-level storage device 126, third-level storage device 128, and fourth-level storage device 129 depends on the following conditions: if it is assumed that external data access is made after or during data transfer, data transfer via the controller 110 is selected. This is for combining the external data access and the access to the first-level storage device 124, second-level storage device 126, third-level storage device 128, and fourth-level storage device 129 during data transfer into one.

Unless the above conditions are met, a direct data transfer path is selected.

The connection shown in FIG. 3(*a*) is a subset of the connection of FIG. 3(*b*).

Figure 4:
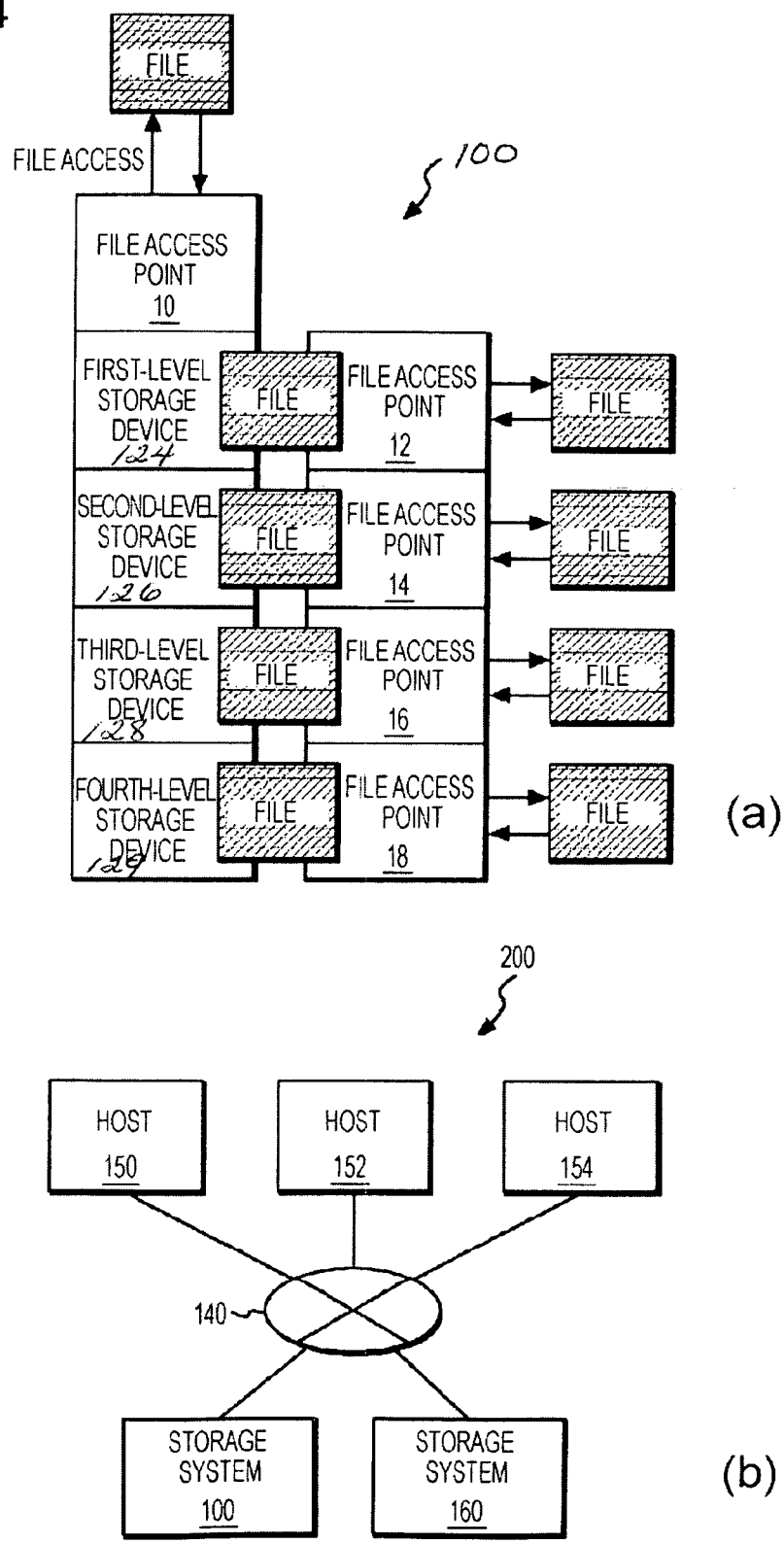
FIG. 4(a) shows a block diagram of a storage system according to an embodiment of the invention.
FIG. 4(b) shows a block diagram of an example of a connection between a storage system according to the embodiment of the invention and another computer.
Figure 5:
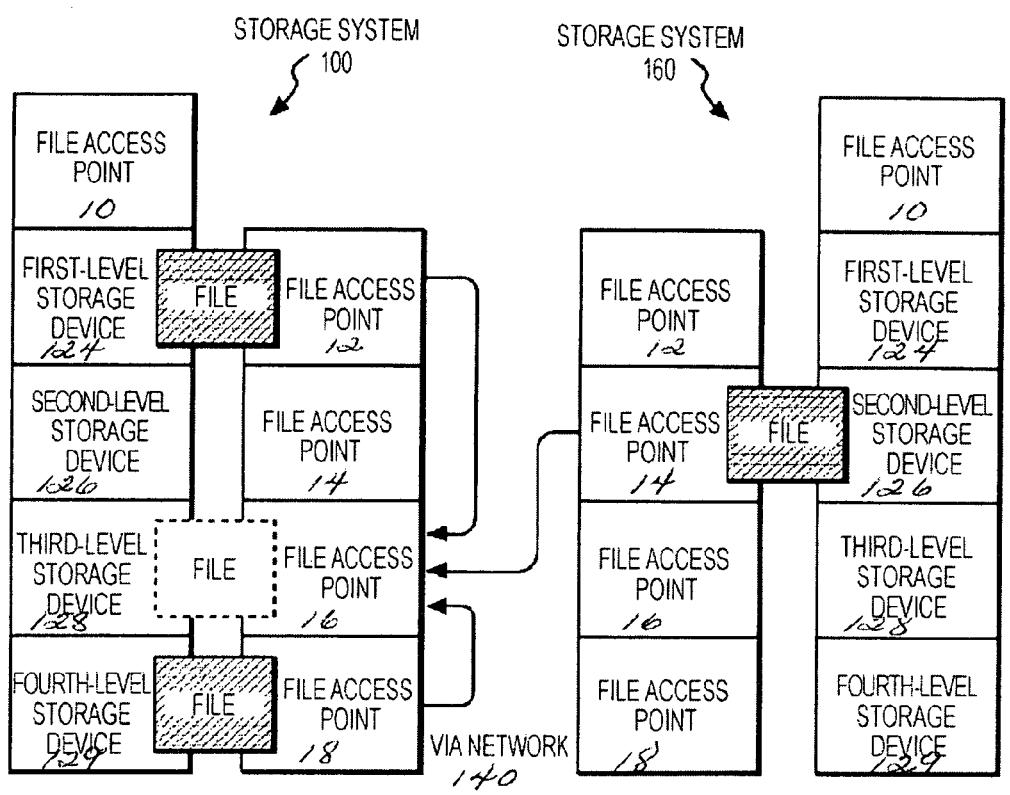
FIG. 5 shows a conceptual diagram of an example of file replication of a storage system according to an embodiment of the invention.

FIG. 4(*b*) shows a connection between the storage system 100 shown in FIG. 2 and another computer. As shown in FIG. 4(*b*), the storage system 100 of this embodiment connects to host computers 150, 152, and 154 via a network 140. The storage system 100 also connects to a second storage system 160. Referring now to FIG. 5, problems in data replication or transfer (hereinafter, simply referred to as replication) to a storage device of any level in the storage system 100 will be specifically described. The host computers 150, 152, or 154 and the second storage system 160 shown in FIG. 4(*b*) are examples of other computers that may be connected to the storage system 100.

FIG. 5 is a conceptual diagram of one example of file replication of the system 200 shown in FIG. 4(*b*). The second storage system 160 has the same structure as that of the storage system 100 described with reference to FIGS. 2 to 4. Assume that file replication is executed in the third-level storage device 128 of the storage system 100, and files to be replicated are present in the first-level storage device 124 and the fourth-level storage device 129 of the storage system 100 and the second-level storage device 126 of the storage system 160. In this specification, the term "file" has the same meaning as the term "data" and they are not distinguished from each other.

In the storage system 100 of this invention, the controller 110 selects an optimum storage device from first-level storage device 124, second-level storage device 126, third-level storage device 128, and fourth-level storage device 129 having the object file as a source storage device in consideration of the performance and load statuses of the storage devices.

In the example of FIG. 5, in terms of the performance of the first-level storage device 124, second-level storage device 126, third-level storage device 128, and fourth-level storage device 129, the fastest first-level storage device 124 of the storage system 100 is selected as a source storage device. Also in consideration of the load statuses of the first-level storage device 124, second-level storage device 126, third-level storage device 128, and fourth-level storage device 129, for example, in the case where the first-level storage device 124 of the storage system 100 processes another replication, the relatively high-speed second-level storage device 126 is selected as a source storage device under the condition that no congestions occur in the network 140. The controller 110 of the invention will be described in more detail with reference to FIG. 6.

Figure 6:
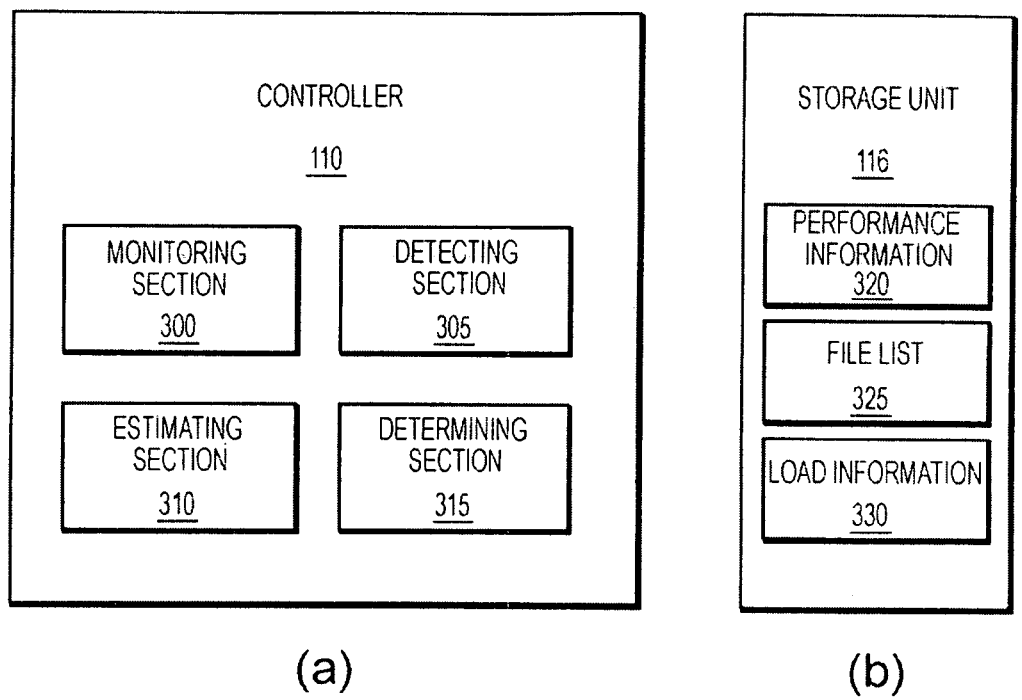
FIG. 6(a) shows an example of a functional structure of a controller according to an embodiment of the invention.
FIG. 6(b) shows examples of data stored in a storage unit.

FIG. 6(*a*) shows an example of the functional structure of the controller 110 of the storage system 100 according to this embodiment. The controller 110 includes a monitoring section 300, a detecting section 305, an estimating section 310, and a determining section 315. FIG. 6(*b*) shows examples of data stored in the storage unit 116 shown in FIG. 2. As described above, the storage system 100 of this embodiment connects to the second storage system 160 with the same structure via the network 140.

The storage unit 116 stores the performance information 320 of the first-level storage device 124, second-level storage device 126, third-level storage device 128, and fourth-level storage device 129 of the storage system 100 and the first-level storage device 124, second-level storage device 126, third-level storage device 128, and fourth-level storage device 129 of the storage system 160 connected to the storage system 100. The storage-device performance information 320 indicates the performance of the first-level storage device 124, second-level storage device 126, third-level storage device 128, and fourth-level storage device 129 and can be used to calculate the time required to transfer or replicate data from the first-level storage device 124, second-level storage device 126, third-level storage device 128, and fourth-level storage device 129. Preferably, the first-level storage device 124, second-level storage device 126, third-level storage device 128, and fourth-level storage device 129 performance information 320 includes the access time and data transfer rate of the first-level storage device 124, second-level storage device 126, third-level storage device 128, and fourth-level storage device 129.

More preferably, the storage-device performance information 320 includes the transfer rate of the network 140 between the storage system 100 and the second storage system 160 with no congestions present. Furthermore, the storage-device performance information 320 may include information on limitation of the use of the first-level storage device 124, second-level storage device 126, third-level storage device 128, and fourth-level storage device 129 of the storage systems 100 and 160. For example, the limitation information may be that the first-level storage device 124 is excluded from the candidates of the source storage device. This allows the first-level storage device 124 to give a high priority to an access request from the outside of the storage system 100 and 160 over an access request from the inside of the storage system 100 and 160.

FIG. 7 shows an example of the performance information 320 stored in the storage unit 116. The performance information 320 of this embodiment is shared by the storage system 100 and the storage system 160. As shown in FIG. 7, both the storage systems 100 and 160 include a first-level semiconductor memory 710, a second-level magnetic disk 720, a third-level optical disk 730, and a fourth-level magnetic tape 740. The access time t (sec) of the first-level storage device 124, second-level storage device 126, third-level storage device 128, and fourth-level storage device 129 increases as the level falls. The data transfer rate D (byte/sec) is the highest in the highest-level semiconductor memory 710, and the second in the fourth-level magnetic tape 740. Of the subscripts of the access time t and the data transfer rate D shown in the table of FIG. 7, alphabet A denotes the storage system 100, and the numerical subscript designate what level the storage device corresponds to.

The network transfer rate N (byte/sec) is the transfer rate of the network 140 between the storage system 100 and the second storage system 160, and is common to the storage devices in all the levels. The system limitation is imposed only on the first-level semiconductor memory 710. The limitation is that only access requests from the outside of the storage systems 100 and 160 are accepted. The performance information 320 is stored in the storage unit 116 in advance by the administrator of the administrative terminal 130.

The storage unit 116 also stores a file list 325 that is a list of the files stored in the storage devices of the storage system 100. The file list 325 is produced by the controller 110. This is because the controller 110 controls the data writing from the outside of the storage system 100 and the transfer and replication of data among the first-level storage device 124, second-level storage device 126, third-level storage device 128, and fourth-level storage device 129 in the storage system 100.

Preferably, the storage unit 116 stores a file list stored in the first-level storage device 124, second-level storage device 126, third-level storage device 128, and fourth-level storage device 129 of the second storage system 160 as the file list 325. In this case, the file list is acquired from the storage system 160 and stored in the storage unit 116 by the controller 110. The file list 325 allows the controller 110 to always grasp which file is present in which level of storage device.

The storage unit 116 further stores load information 330 indicative of the present load of the first-level storage device 124, second-level storage device 126, third-level storage device 128, and fourth-level storage device 129 and the controller 110 of the storage system 100. A method for acquiring the load information will be described later in detail. Preferably, the storage unit 116 further stores the load information on the first-level storage device 124, second-level storage device 126, third-level storage device 128, and fourth-level storage device 129 and the controller 110 of the storage system 160 as the load information 330. More preferably, the storage unit 116 stores the load information on the network 140 between the storage system 100 and the storage system 160 as the load information 330.

The monitoring section 300 monitors the load statuses of the first-level storage device 124, second-level storage device 126, third-level storage device 128, and fourth-level storage device 129 and the controller 110 of the storage system 100. For example, the monitoring section 300 continuously monitors the data transfer of the storage devices of every level and calculates a present data transfer rate D' from a fixed amount of data transferred from the first-level storage device 124, second-level storage device 126, third-level storage device 128, and fourth-level storage device 129. The monitoring section 300 then stores the normal data transfer rate of the first-level storage device 124, second-level storage device 126, third-level storage device 128, and fourth-level storage device 129, that is, the ratio $\alpha$ of the present data transfer rate D' to the data transfer rate D of the storage devices under no load, as shown in the table of FIG. 7, into the storage unit 116 as the present load information 330 of the storage devices.

The monitoring section 300 also continuously monitors, for example, the use rate of the processor 112 and the memory 114 of the controller 110, and stores the ratio $\beta$ of the present use rate to the use rate during idling in the storage unit 116 as the present load information 330 of the controller 110. The load statuses of the storage devices and the controller of the storage system 160 are also continuously monitored. For example, the storage system 160 gives load information to the controller 110 every time the load statuses change. The controller 110 stores the acquired load information in the storage unit 116 as part of the load information 330. In place of the above structure, each time the controller 110 may inquire of the controller of the storage system 160 about the load information on the storage system 160.

The monitoring section 300 also monitors the load status of the network 140 between the storage system 100 and the storage system 160. For example, the monitoring section 300 continuously monitors the data transfer of the network 140 between the storage system 100 and the storage system 160, and calculates a present data transfer rate N' from a fixed amount of data received from the storage system 160. The monitoring section 300 stores the normal data transfer rate of the network 140 between the storage system 100 and the storage system 160, that is, the ratio $\gamma$ of the present data transfer rate N' to the data transfer rate N under no load, as shown in the table of FIG. 7, into the storage unit 116 as the present load information 330 of the network 140 between the storage system 100 and the storage system 160.

FIG. 8 shows an example of the load information 330 stored in the storage unit 116, wherein FIG. 8($a$) is a table showing an example of the load information 330 of one of the first-level storage device 124, second-level storage device 126, third-level storage device 128, or fourth-level storage device 129 of the storage system 100. As described above, the load of each of the first-level storage device 124, second-level storage device 126, third-level storage device 128, and fourth-level storage device 129 of this embodiment is expressed by the ratio α of the present data transfer rate D' to the data transfer rate D of each storage under no load. As an alternative, the ratio α may be weighted according to the present processing quantity of the first-level storage device 124, second-level storage device 126, third-level storage device 128, or fourth-level storage device 129, and the weighted value may be used as the load of the first-level storage device 124, second-level storage device 126, third-level storage device 128, or fourth-level storage device 129.

The weighted value α' can be found by the following equation: α'=α×i, where i is the present processing quantity, which is s a numerical value from 0 to 1 and depends on the performance of the first-level storage device 124, second-level storage device 126, third-level storage device 128, or fourth-level storage device 129. That is, if the performance of the first-level storage device 124, second-level storage device 126, third-level storage device 128, or fourth-level storage device 129 is so high that its throughput does not decrease even by multiple processing quantities at the same time, i takes a value close to 1. In contrast, if the performance of the first-level storage device 124, second-level storage device 126, third-level storage device 128, or fourth-level storage device 129 is so low that its throughput drops sharply by multiple processing quantities at the same time, i takes a value close to 0. Of the subscripts of a shown in the table of FIG. 8(a), alphabet A denotes the storage system 100, and the numerical subscript designates what level the storage device corresponds to.

FIG. 8(b) shows a table of one example of the load information 330 of the storage systems 100 and 160. As described above, the load of the storage system 100 is expressed by the ratio β of the present use rate of the processor 112 of the controller 110 to the use rate during idling. As an alternative, the use rate of the memory 114 of the controller 110 may be used. As another alternative, the product of the multiplication of the use rates of the processor 112 and the memory 114 may be used. Of the subscripts of β shown in the table of FIG. 8(b), alphabet A denotes the storage system 100, and alphabet B designates the storage system 160.

FIG. 8(c) shows a table of an example of the load information 330 of the network 140 between the storage system 100 and the storage system 160. As described above, the load of the network 140 is expressed by the ratio γ of the present data transfer rate N' to the data transfer rate N under no load. As an alternative, the ratio β may be weighted according to the number of the present transfer requests between the storage system 100 and the storage system 160, and the weighted value may be used as the load of the network 140.

The weighted value β' can be found by the following equation: β'=β×i, where i is the number of present transfer requests, which is a value from 0 to 1 and depends on the performance of the network 140. That is, if the performance of the network 140 is so high that its throughput does not decrease even by processing multiple transfer requests at the same time, i takes a value close to 1. In contrast, if the performance of the network 140 is so low that its throughput drops sharply by processing multiple transfer requests at the same time, i takes a value close to 0. The load information 330 shown in FIG. 8 is continuously updated to new values by the monitoring section 300.

Before data is replicated in any of the first-level storage device 124, second-level storage device 126, third-level storage device 128, or fourth-level storage device 129 in the storage system 100, the detecting section 305 detects the first-level storage device 124, second-level storage device 126, third-level storage device 128, or fourth-level storage device 129 in which the data to be replicated is stored according to the file list 325 stored in the storage unit 116. In this embodiment, the first-level storage device 124, second-level storage device 126, third-level storage device 128, and fourth-level storage device 129 in the storage system 160 are also searched. As an alternative, the detecting section 305 may inquire of the storage system 160 whether or not the data to be transferred or replicated is present before data transfer or replication.

The estimating section 310 estimates the time required to replicate data of S bytes from the storage devices detected by the detecting section 305 to a destination storage device on the basis of the performance information 320 stored in the storage unit 116 and the load information 330 monitored by the monitoring section 300. For example, the estimating section 310 estimates time T required to replicate data by the following equation:

$$T = t \times (1/\beta) + \{S/(D \times \alpha)\} + \{S/(N \times \gamma)\} \quad \text{(Eq. 1)}$$

In the above equation, t, D, and N are performance information 320 stored in the storage unit 116. That is, t is the access time of first-level storage device 124, second-level storage device 126, third-level storage device 128, or fourth-level storage device 129, D is the data transfer rate of first-level storage device 124, second-level storage device 126, third-level storage device 128, or fourth-level storage device 129, and N is the data transfer rate of the network 140 between the first-level storage device 124, second-level storage device 126, third-level storage device 128, and fourth-level storage device 129. N takes an infinite value for the first-level storage device 124, second-level storage device 126, third-level storage device 128, and fourth-level storage device 129 in the storage system 100. That is, when estimating the time T required to replicate data into the first-level storage device 124, second-level storage device 126, third-level storage device 128, or fourth-level storage device 129 in the storage system 100, the third term on the right side of the above equation is ignored.

In the above equation α, β, and γ are load information 330 stored in the storage unit 116. That is, α is the load of the first-level storage device 124, second-level storage device 126, third-level storage device 128, or fourth-level storage device 129, β is the load of the controller 110 of a storage system 100 to which a the first-level storage device 124, second-level storage device 126, third-level storage device 128, or fourth-level storage device 129 to be estimated belongs, and γ is the load of the network between storage systems 100 and 160, which have the relation 0<α, β, γ<1. The higher the load, the closer to 0 α, β, and γ are. Although Eq. 1 does not express the transmission distance between storage systems 100 and 160, delay time due to the transmission distance is at an acceptable level.

The determining section 315 determines first-level storage device 124, second-level storage device 126, third-level storage device 128, or fourth-level storage device 129 to be the source of data replication from the estimate by the estimating section 310. Preferably, the determining section 315 determines one of the first-level storage device 124, second-level storage device 126, third-level storage device 128, or fourth-level storage device 129 having the minimum estimation time T as the source of data replication.

Figure 9:
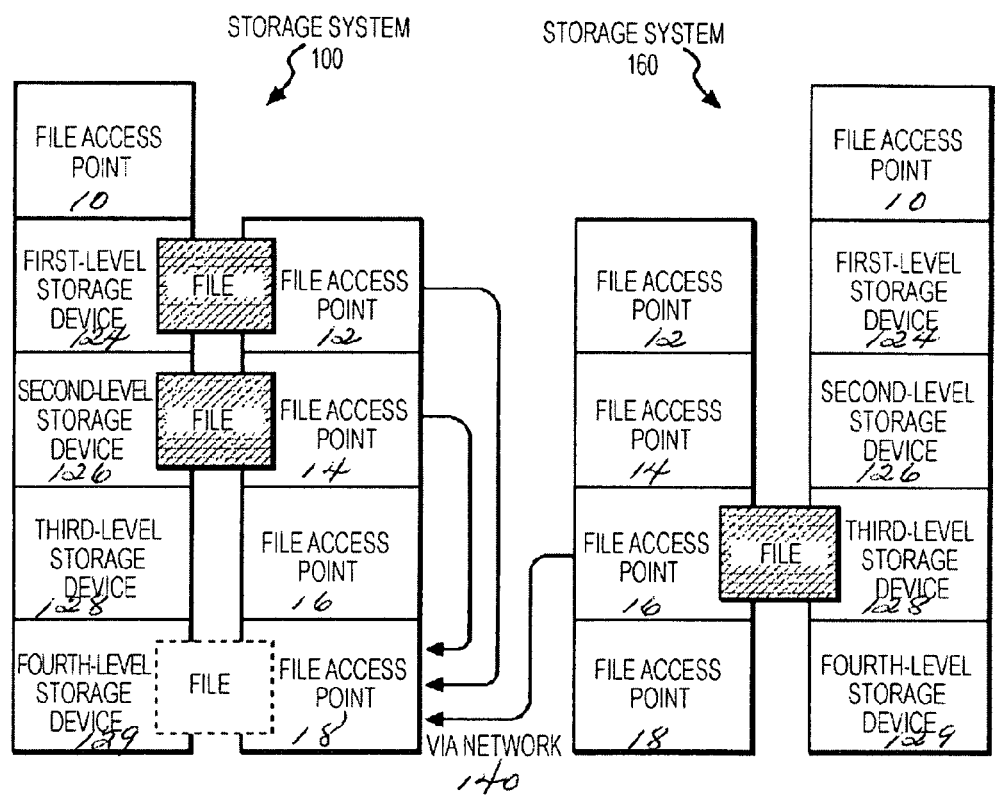
FIG. 9 shows a conceptual diagram of an example of file replication of a storage system according to an embodiment of the invention.

Referring to FIG. 9, the process of determining a source storage device by the controller 110 will be specifically described. In the example of FIG. 9, assume that file replication must be executed in the fourth-level storage device 129 of the storage system 100 and that the object file is present in the first-level storage device 124 and the second-level storage device 126 of the storage system 100 and the third-level storage device 128 of the storage system 160. Further assume that the storage unit 116 of the storage system 100 stores the table shown in FIG. 7 as the performance information 320.

In this case, although the first-level storage device 124 of the storage system 100 has the object file, access to the first-level storage device 124 from the interior of the storage system 100 is not permitted, as shown in the table of FIG. 7. Therefore, the detecting section 305 detects two storage devices, the second-level storage device 126 of the storage system 100 and the third-level storage device 128 of the storage system 160, as the candidates of the source storage device.

Based on the detection of the detecting section 305, the estimating section 310 estimates replication time of the second-level storage device 126 of the storage system 100 and the third-level storage device 128 of the storage system 160 using Equation 1.

Specifically, the estimating section 310 estimates replication time $T_{A2}=t_{A2}\times(1/\beta_{A2})+\{S/(D_{A2}\times\alpha_{A2})\}$ of the second-level storage device 126 of the storage system 100. The estimating section 310 also estimates replication time $T_{B3}=t_{B3}\times(1/\beta_{B3})+\{S/(D_{B3}\times\alpha_{B3})\}+\{S/(N\times\gamma)\}$ of the third-level storage device 128 of the storage system 160. Assume that the second-level storage device 126 of the storage system 100 and the third-level storage device 128 of the storage system 160 are idle and that the controllers of the storage systems 100 and 160 are idle. Then $T_{A2}<T_{B3}$ holds because $t_{A2}<t_{B3}$ and $D_{B3}<D_{A2}$. Thus, the determining section 315 determines the second-level storage device 126 of the storage system 100 as a source storage device.

However, if another data replication is executed in the second-level storage device 126 of the storage system 100, the normal data transfer rate $D_{A2}$ of the second-level storage device 126 may not be obtained because of load by the replication. In that case, unless load is present in the network between the storage system 100 and the storage system 160, then $t_{A2}\times(1/\beta_{A2})+\{S/(D_{A2}\times\alpha_{A2})\}>t_{B3}\times(1/\beta_{B3})+\{S/(D_{B3}\times\alpha_{B3})\}+\{S/(N\times\gamma)\}$ can hold. If $T_{A2}>T_{B3}$ holds actually, the determining section 315 determines the third-level storage device 128 of the storage system 160 as a source storage device.

As described above, the controller 110 of the invention temporarily regards any of the first-level storage device 124, second-level storage device 126, third-level storage device 128, or fourth-level storage device 129 having object data as the candidates of a source storage device. The controller 110 then estimates replication time in consideration of the load of the first-level storage device 124, second-level storage device 126, third-level storage device 128, or fourth-level storage device 129 and the load of the network 140 line, and determines a storage device first-level storage device 124, second-level storage device 126, third-level storage device 128, or fourth-level storage device 129 having the minimum estimated replication time from the candidates of the multiple storage devices (first-level storage device 124, second-level storage device 126, third-level storage device 128, or fourth-level storage device 129), as a source storage device. Finally, the data is directly replicated from the determined source storage device (first-level storage device 124, second-level storage device 126, third-level storage device 128, or fourth-level storage device 129), to a destination storage device (first-level storage device 124, second-level storage device 126, third-level storage device 128, or fourth-level storage device 129), under the control of the controller 110. This reduces the consumption of resources and energy during data replication among multiple storage devices (first-level storage device 124, second-level storage device 126, third-level storage device 128, and fourth-level storage device 129), allowing data replication in a shorter time.

Figure 10:
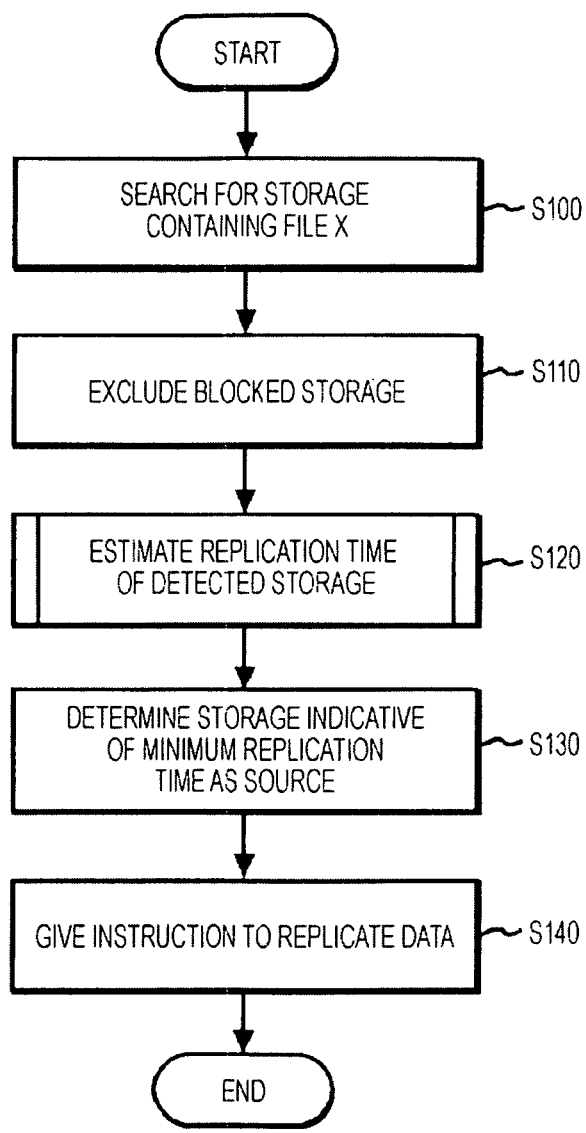
FIG. 10 shows a flowchart for a process by a controller according to an embodiment of the invention.

Referring next to the flowcharts in FIGS. 10 and 11, the operation of the controller 110 according to this embodiment will be described. The process starts from the replication in any of the storage devices (first-level storage device 124, second-level storage device 126, third-level storage device 128, or fourth-level storage device 129), in the storage system 100. The controller 110 searches for storage devices (first-level storage device 124, second-level storage device 126, third-level storage device 128, or fourth-level storage device 129), in which a file X to be replicated is stored with reference to the file list 325 stored in the storage unit 116 (step 100). At that time, the controller 110 excludes limited-access storage devices of the found storage devices from the candidates of a source storage device (first-level storage device 124, second-level storage device 126, third-level storage device 128, or fourth-level storage device 129), with reference to the performance information 320 stored in the storage unit 116 (step 110). For the second storage system 160, the controller 110 may inquire of the controller of the storage system 160 whether or not the object file X is present.

The process moves to step 120, where the controller 110 estimates the time to replicate the object file X from each of the candidates of the source storage device (first-level storage device 124, second-level storage device 126, third-level storage device 128, or fourth-level storage device 129), to a destination storage system with reference to the performance information 320 and the load information 330 stored in the storage unit 116. A method for estimating the replication time will be described later with reference to FIG. 11.

The controller 110 then compares the replication times of the storage devices (first-level storage device 124, second-level storage device 126, third-level storage device 128, or fourth-level storage device 129), and determines, for example, a storage device (first-level storage device 124, second-level storage device 126, third-level storage device 128, or fourth-level storage device 129), having the minimum estimated replication time as a source storage device (step 130). The controller 110 gives an instruction to replicate data from the storage device (first-level storage device 124, second-level storage device 126, third-level storage device 128, or fourth-level storage device 129), that is determined to be the replication source to a destination storage device (step 140), and the process is completed.

Figure 11:
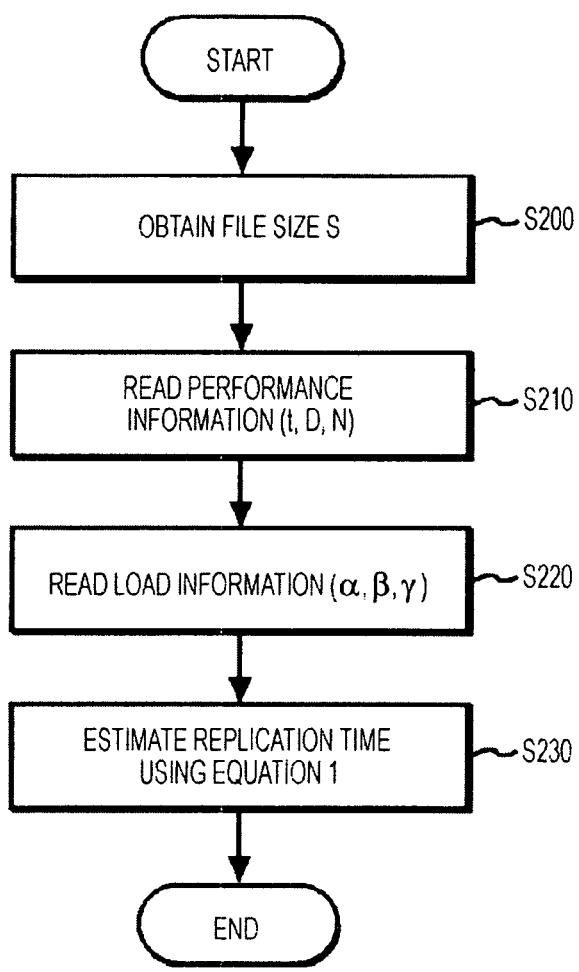
FIG. 11 shows a flowchart for an estimation process by an estimating section according to an embodiment of the invention.

FIG. 11 shows a flowchart for the estimation process by the estimating section 310 of the controller 110. The process starts at step 200, where the estimating section 310 first determines the size S of the object file X. Next, the estimating section 310 reads the performance information 320 stored in the storage unit 116, and determines the access time t, the data transfer rate D, and the data transfer rate N of the network, if applicable, for each of the candidates of a source storage device (first-level storage device 124, second-level storage device 126, third-level storage device 128, or fourth-level storage device 129), (step 210).

The estimating section 310 also reads the load information 330 stored in the storage unit 116, and obtains the load $\alpha$ of each of the candidates of a source storage device (first-level storage device 124, second-level storage device 126, third-level storage device 128, or fourth-level storage device 129), the load $\beta$ of the controller, and the load $\gamma$ of the network 140, if applicable (step 220). The estimating section 310 may either obtain such information directly from the monitoring section 300 or, for the storage system 160, directly inquire of the storage system 160.

The estimating section 310 then estimates replication time of each of the candidates of a source storage device (first-level storage device 124, second-level storage device 126, third-level storage device 128, or fourth-level storage device 129), using Equation 1 (step 230), and the process is completed.

The invention may be achieved entirely by hardware or software or by both of hardware and software. The invention can be achieved as a computer, a data processing system, or a computer program. The computer program can be provided via a computer-readable medium. Here, examples of the medium include an electronic, magnetic, optical, electromagnetic, infrared, or semiconductor system (unit or apparatus) or a transmission medium. Examples of the computer-readable medium are semiconductor solid-state storage devices, magnetic tape, removable computer diskettes, random access memories (RAMs), read-only memories (ROMs), rigid magnetic disks, and optical disks. Examples of the optical disks at the present time are compact disc read-only memories (CD-ROMs), compact disc read/write memories (CD-R/Ws), and DVDs.

While the invention has been described in its preferred embodiments, it is to be understood that the technical scope of the invention is not limited to the scope of the embodiment. For example, although the embodiment has been described for the case in which the invention is mounted to the controller 110 of the storage system 100, the invention can be installed in any computer connected to multiple storage systems. It will be obvious to those skilled in the art that the embodiments can be changed or modified variously. Accordingly, such changes or modifications should be considered to be within the technical scope of the invention.

The invention claimed is:

1. A control apparatus connected to storage devices, the control apparatus comprising:
a performance-information storing section that stores performance information on the storage devices;
a list storing section that stores a list of data stored in the storage devices;
a monitoring section that monitors a load status of each of the storage devices and of the control apparatus;
a detecting section that detects a storage device that stores data to be transferred or replicated on the basis of the list stored in the list storing section before the data is transferred or replicated to any of the storage devices;
an estimating section that estimates the time required to transfer or replicate the data from each of the storage devices detected by the detecting section to a destination storage device on the basis of the performance information and the load information monitored by the monitoring section; and
a determining section that determines a source of data transfer or replication on the basis of estimates made of by the estimating section.

2. The control apparatus according to claim 1, wherein the different types of storage devices include a storage device that is directly connected to the control apparatus to configure a storage system in conjunction with the control apparatus.

3. The control apparatus according to claim 2, wherein the control apparatus includes a communication interface that communicates with a second storage system via a network; and the different types of storage devices include a storage device that configures the second storage system connected to the storage system via the network.

4. The control apparatus according to claim 3, wherein the monitoring section monitors the load status of the network and inquires of the second storage system about the load statuses of the storage device of the storage system and the control apparatus via the communication interface.

5. The control apparatus according to claim 3, wherein before data is transferred or replicated to any of the storage devices, the detecting section inquires of the second storage system via the communication interface whether or not data to be transferred or replicated is present.

6. The control apparatus according to claim 3, wherein the performance-information storing section further stores the transfer speed of the network for a state of no congestion; and the estimating section estimates the time required for transfer or replication on the basis of the transfer rate of the network.

7. The control apparatus according to claim 6, wherein the estimating section estimates the time required for transfer or replication by subtracting the transfer rate of the network according to the load information on the network monitored by the monitoring section.

8. The control apparatus according to claim 1, wherein the determining section determines a storage device having the minimum estimated time as the source of data transfer or replication.

9. The control apparatus according to claim 1, wherein the storage-device performance information includes the access time and the data transfer rate of the storage devices.

10. The control apparatus according to claim 9, wherein the estimating section estimates the time required for transfer or replication by subtracting the data transfer rate of the storage devices according to the load information on the storage devices monitored by the monitoring section.

11. The control apparatus according to claim 9, wherein the estimating section estimates the time required for transfer or replication by subtracting the access time of the storage devices according to the load information on the control apparatus monitored by the monitoring section.

12. The control apparatus according to claim 1, wherein the storage-device performance information includes information on use limitation imposed on storage devices by the storage system of the storage devices; and the detecting section limits storage devices to be searched according to the limitation information.

13. A storage system comprising:
different types of storage devices; and
a control apparatus for controlling the input and output of data to/from the different types of storage devices, the control apparatus including:
a performance-information storing section that stores performance information on the storage devices;
a list storing section that stores a list of data stored in the storage devices;
a monitoring section that monitors a load status of each of the storage devices and of the control apparatus;
a detecting section that detects a storage device that stores data to be transferred or replicated on the basis of the list stored in the list storing section before the data is transferred or replicated to any of the storage devices;
an estimating section that estimates the time required to transfer or replicate the data from each of the storage devices detected by the detecting section to a destination storage device on the basis of the performance information and the load information monitored by the monitoring section; and a determining section that determines a source of data transfer or replication on the basis of estimates made by the estimating section.

14. The storage system according to claim 13, wherein the different types of storage devices are connected to one another so that data transfer or replication between any two storage devices can be executed without data passing through the other storage devices except the two storage devices.

15. The storage system according to claim 13, wherein the control apparatus includes a communication interface that communicates with a second storage system via a network; the performance-information storing section stores performance information on the storage devices of the second storage system; before data is transferred or replicated from the storage device, the detecting section inquires of the second storage system via the communication interface whether or not data to be transferred or replicated is present; and the monitoring section monitors the load status of the network and inquires of the second storage system about the load statuses of the storage devices of the second storage system and the control apparatus via the communication interface.

16. A method for controlling data transfer or replication that is executed by a control apparatus connected to different types of storage devices via a network or directly, the method comprising the steps of:

monitoring a load status of each of the different types of storage devices and the network;

detecting a storage device that stores data to be transferred or replicated from among the different types of storage system before the data is transferred or replicated to any of the storage devices;

estimating the time required to transfer or replicate the data from each of the detected storage devices to a destination storage device on the basis of performance and the load status of each of the storage devices; and determining a source storage device of data transfer or replication on the basis of the estimating.

17. A program product comprising:

a computer usable non-transitory storage device having computer useable program code for controlling data transfer or replication that is executed by a control apparatus connected to different types of storage devices via a network or directly, the program product comprising:

computer useable program code for monitoring a load status of each of the different types of storage devices and of the network;

computer useable program code for detecting a storage device that stores data to be transferred or replicated from among the different types of storage system before the data is transferred or replicated to any of the storage devices;

computer useable program code for estimating the time required to transfer or replicate the data from each of the detected storage devices to a destination storage device on the basis of performance and the load status of each of the storage devices; and computer useable program code for determining a source storage device of data transfer or replication on the basis of the estimates.

* * * * *